United States Patent [19]

Taguchi et al.

[11] Patent Number: 5,279,699
[45] Date of Patent: Jan. 18, 1994

[54] STICKING APPARATUS

[75] Inventors: Hiroshi Taguchi, Tokyo; Youji Washizaki, Saitama; Akira Igarashi, Tokyo; Hiroyoshi Nakano, Saitama, all of Japan

[73] Assignee: Somar Corporation, Tokyo, Japan

[21] Appl. No.: 658,471

[22] Filed: Feb. 20, 1991

[30] Foreign Application Priority Data

May 22, 1990 [JP] Japan .................. 2-132046

[51] Int. Cl.⁵ .............................................. B32B 31/00
[52] U.S. Cl. ...................................... 156/522; 156/567;
156/269; 156/568; 156/87; 156/406.4; 156/569;
156/552; 156/538
[58] Field of Search ............... 156/522, 567, 269, 568,
156/87, 406.4, 569, 552, 538

[56] References Cited

U.S. PATENT DOCUMENTS

| | | | |
|---|---|---|---|
| 3,897,293 | 7/1975 | Babcock | 156/568 |
| 4,052,249 | 10/1977 | Bruce et al. | 156/513 |
| 4,264,397 | 4/1981 | Kawashima et al. | 156/513 |
| 4,362,594 | 12/1982 | Nagano et al. | 156/567 |
| 4,946,524 | 8/1990 | Stumpf et al. | 156/87 |
| 4,961,803 | 10/1990 | Hamamura et al. | 156/269 |
| 5,078,820 | 1/1992 | Hamamura et al. | 156/289 |
| 5,125,999 | 6/1992 | Sumi et al. | 156/87 |

Primary Examiner—Patrick J. Ryan
Assistant Examiner—Merrick Dixon
Attorney, Agent, or Firm—Sughrue, Mion, Zinn, Macpeak & Seas

[57] ABSTRACT

A sticking apparatus in which a continuous film loaded on a film supply roller is cut off to a prescribed length and a base panel conveyed by a base panel conveyor is moved while said film is stuck, under pressure, to the plate by a pressure sticking roller. Support members for the roller are provided on the body of the apparatus so that the members can be moved rightward or leftward in order that the portion of the film, which is fed from the roller, and the other portion of the film, which is stuck to the plate, are made coincident with each other at the center line of the former portion in the direction of the feed thereof and that of the letter portion in the direction of the conveyance of the panel.

3 Claims, 17 Drawing Sheets

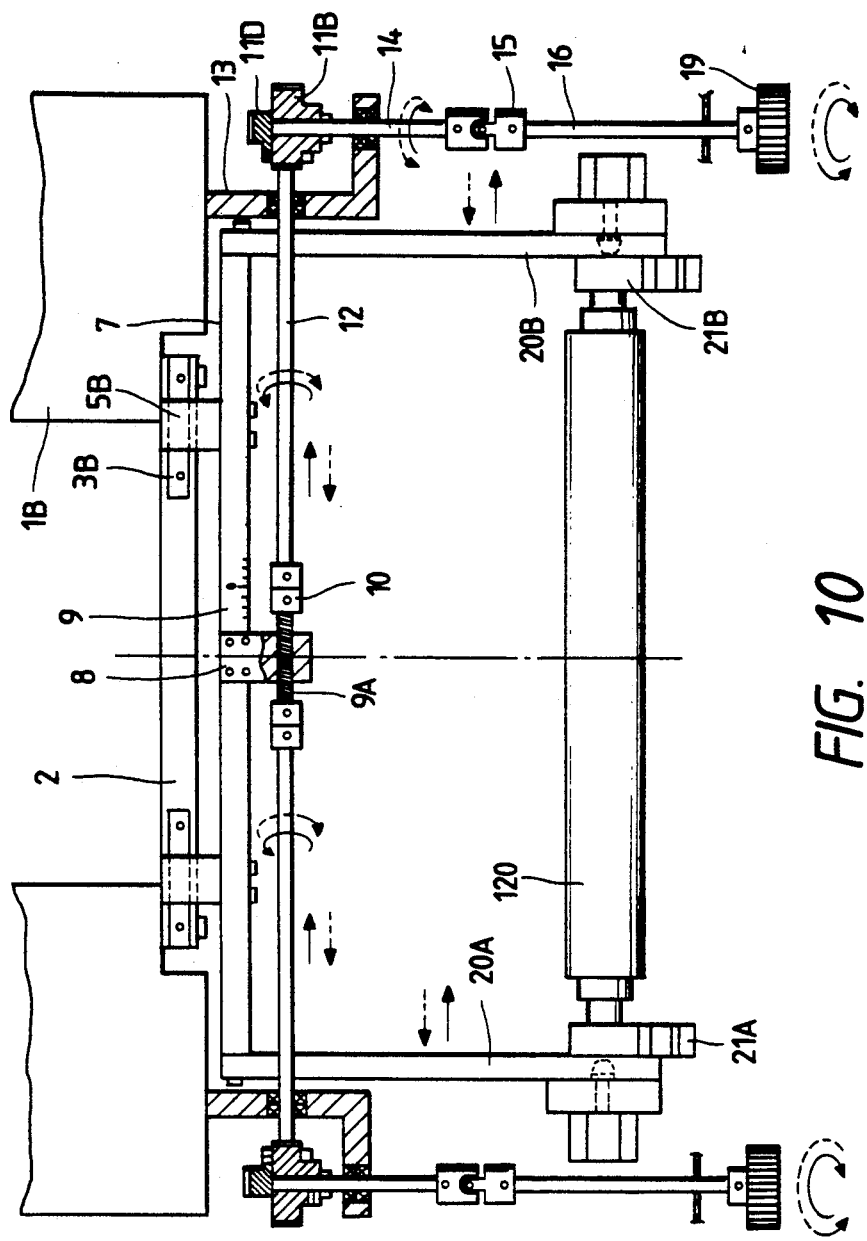
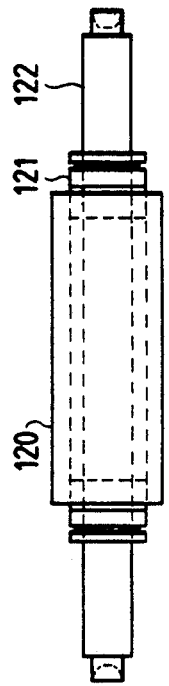
FIG. 9
FIG. 10

STICKING APPARATUS

BACKGROUND OF THE INVENTION

The present invention relates to a sticking apparatus, and more particularly to a film sticking apparatus for adhering film to the film sticking surface of a panel so that the film is set in a position corresponding to the width of the panel.

When a continuous stratified film roll is to be fitted to a film supply roller in a conventional sticking apparatus, film roller securing members are fixedly fitted to the continuous stratified film roll at both the ends thereof and the film supply roller is then set in the body of the apparatus. In preparation for sticking a continuous stratified film for the first time, the leading edge portion of the film is pulled out from the continuous stratified film roll and held on a film feed member (which is a main vacuum suction plate) by suction in such a manner that the film is free of wrinkles. In that case, the center of the width of the continuous stratified film is positioned coincident with the width of the film feed member. The positioning is performed by altering the positional relationship between the film supply roller and the continuous stratified film roll. A panel conveyed by a conveyor is adhered to the continuous stratified film under heat and pressure while a constant tensile force is applied to the film. An apparatus was disclosed in the Japanese Patent Applications (OPI) Nos. 124920/87 and 117487/88 (the term "OPI" as used herein means an "unexamined published application").

The above-mentioned conventional sticking apparatus has problems in that it is time-consuming to position the center of the width of an upper an a lower continuous stratified films coincident with the width of the corresponding one of an upper and a lower film feed members, it is very difficult to precisely perform that positioning, and the operating person of the apparatus is forced to perform the positioning while assuming an uncomfortable posture. The above-mentioned apparatus also has problems in that the film supply roller is heave and complicated in structure, and the film supply rollers are too expensive so as to allow the user of the apparatus to keep extras on hand to enhance the production efficiency thereof. When the film is being adhered to the panel, a constant force is applied to a film supply roller holding shaft, regardless of the width and winding diameter of the continuous stratified film. For that reason, the tension of the film being adhered to the panel changes as the width and/or winding diameter of the film changes. This results in wrinkling of the stuck film and/or the formation of an air bubble between the film and the panel.

SUMMARY OF THE INVENTION

The present invention was made in order to solve the above-mentioned problems. Accordingly, it is an object of the present invention to provide an art in which it is made less likely that a film being adhered to a panel is wrinkled and/or an air bubble is formed between the film and the panel.

It is another object of the present invention to provide an apparatus in which the time which it takes to set upper and a lower continuous stratified films in center positions is minimized and the setting is precisely and easily performed.

It is yet another object of the present invention to provide an apparatus in which the portion of a continuous stratified film, which is fed from a film supply roller, and the other portion of the film, which is adhered to a conveyed panel, are made coincident with each other at the center line of the former portion in the direction of the feed thereof and that of the latter portion in the direction of the conveyance of the panel.

The above-mentioned and other objects and novel features of the present invention will be apparent from the description herein and the drawings attached hereto.

A sticking apparatus provided in accordance with the present invention so as to solve the above-mentioned problems functions so that a continuous film loaded on a film supply roller is cut off to a prescribed length and a panel conveyed by a panel conveyor is moved while the film is adhered, under pressure, to the panel by a pressure sticking roller. The sticking apparatus is characterized in that support members for the film supply roller are provided on the body of the apparatus so that the members can be moved rightward or leftward in order that the portion of the continuous film, which is fed from the roller, and the other portion of the film, which is adhered to the panel, are made coincident with each other at the center line of the former portion in the direction of the feed thereof and that of the latter portion in the direction of the conveyance of the panel. Also, and a means for moving the support members rightward or leftward is provided.

The sticking apparatus may be characterized in that a continuous film width center setting scale is provided in order that the continuous film pulled out from the film supply roller is set in a prescribed position on a film feed member.

The sticking apparatus may be characterized in that a mechanism, by which the panel conveyed by the panel conveyor is trued up into a prescribed position, is provided with a true-up center position setting scale.

The sticking apparatus may be characterized in that an electromagnetic brake and a powder brake are provided at a film supply roller holding shaft; and a means for applying a prescribed tensile force to the continuous film depending on the width and winding diameter of the film is provided.

The sticking apparatus may be characterized in that the support members for the film supply roller and the means for moving the members rightward or leftward are provided over and under a conveyance passage for the panel.

The sticking apparatus may be characterized in that a means by which the continuous film pulled out from the film supply roller is initially positioned in the direction of the width of the film is provided.

In the sticking apparatus provided in accordance with the present invention, the support members for the film supply roller are provided on the body of the apparatus so that the members can be moved rightward or leftward in order that the portion of the continuous film, which is fed from the film supply roller, and the other portion of the film, which is stuck to the conveyed panel, are made coincident with each other at the center line of the former portion in the direction of the feed thereof and that of the latter portion in the direction of the conveyance of the panel. The means for moving the support members rightward or leftward is provided in the apparatus. For these reasons, setting the continuous film on the film supply roller and positioning the center of the width of the film at that of the width of the film feed member, which is a main vacuum suction plate, can be efficiently, securely and easily performed.

If the optimal tensile force is applied to the continuous film depending on the width and winding diameter thereof while adhering the film too the panel, it is less likely that the film is wrinkled and/or an air bubble is formed between the film and the panel.

If the continuous film width center setting scale is provided in order that the continuous film pulled out from the film supply roller is set in the prescribed position on the film feed member, the time which it takes to position the center of the width of the continuous film at that of the width of the film feed member is shortened and the positioning can be performed precisely and easily.

If the mechanism, by which the panel conveyed by the panel conveyor is trued up into the prescribed position, is provided with the true-up center position setting scale, the portion of the continuous film, which is fed from the film supply roller, and the other portion of the film, which is stuck to the conveyed panel, can be easily made coincident with each other at the center line of the former portion in the direction of the feed thereof and that of the latter portion in the direction of the conveyance of the panel.

BRIEF DESCRIPTION OF THE DRAWINGS

In the accompanying drawings:

FIG. 9 is an explanatory view for explaining the operation of the apparatus;

FIG. 10 is a view showing that the stratified film is preset on a film supply roller;

DESCRIPTION OF THE PREFERRED EMBODIMENTS

Figure 1:
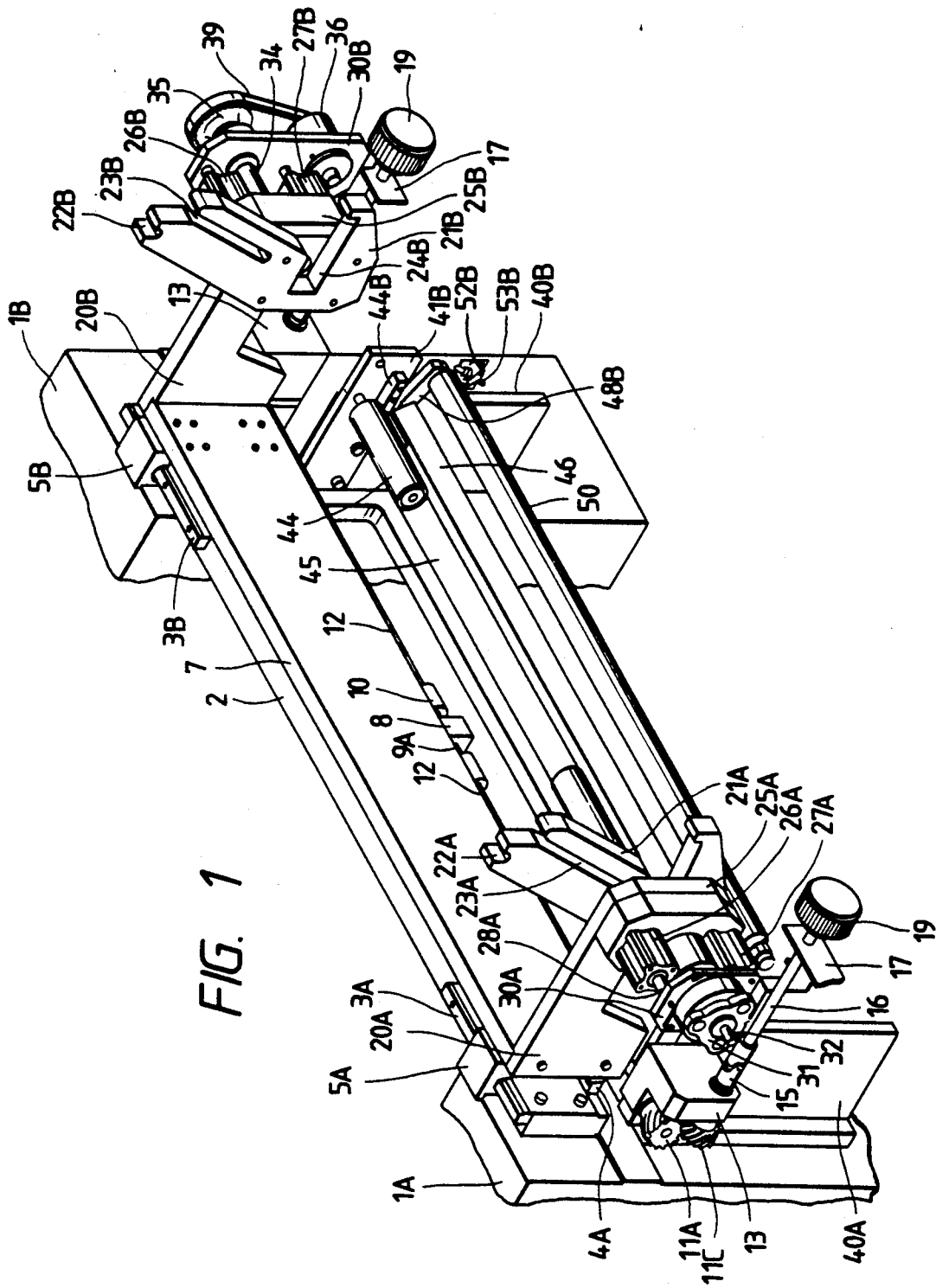
FIG. 1 is a perspective view of the upper film supply section of a sticking apparatus which is an embodiment of the present invention and by which stratified films each consisting of a photosensitive resin layer and light-transmissible resin film are stuck, under heat and pressure, to the top and bottom of a panel for a printed circuit board.
Figure 2:
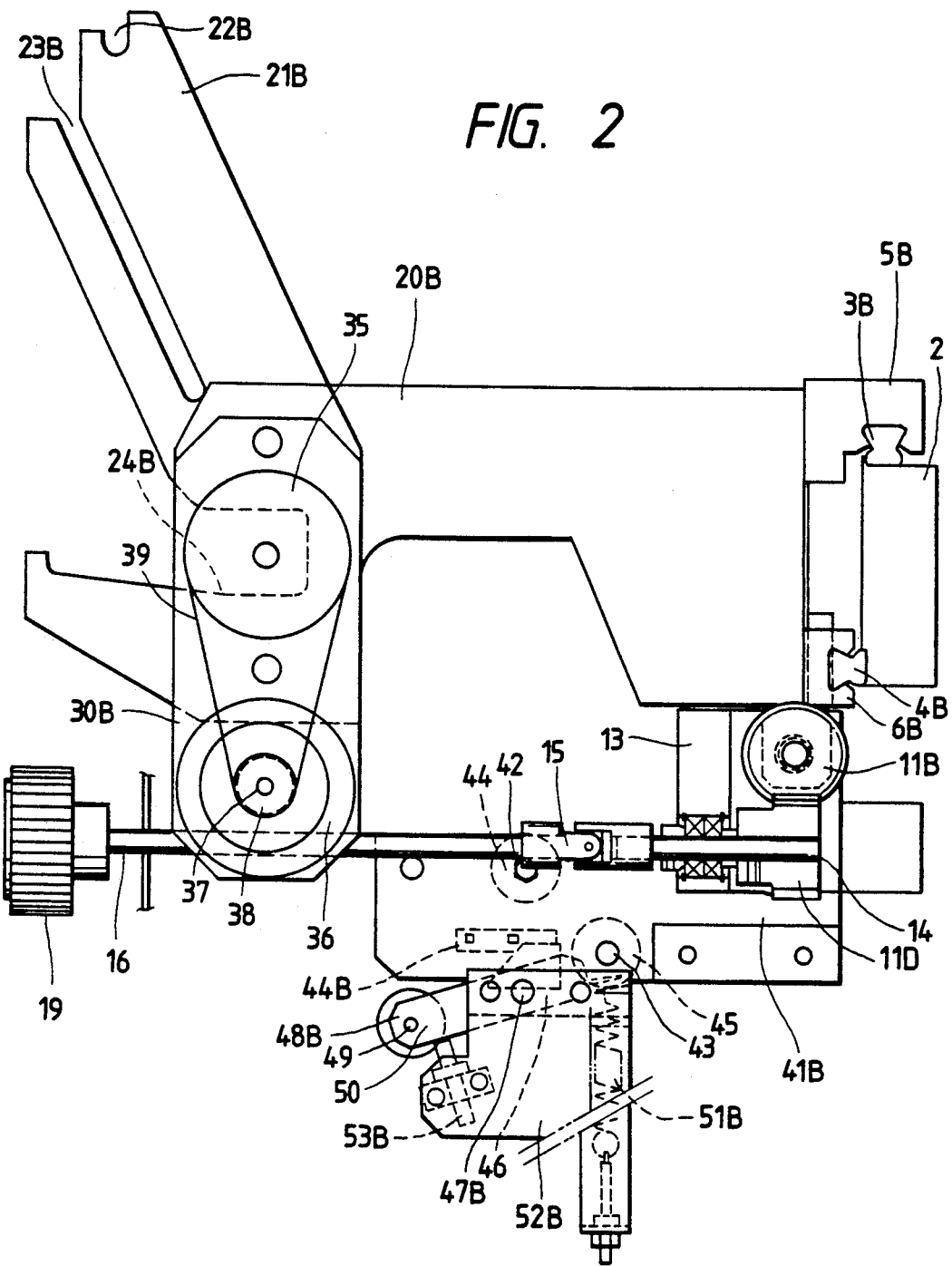
FIG. 2 is a view of the upper film supply section seen from the right side of FIG. 1.
Figure 3:
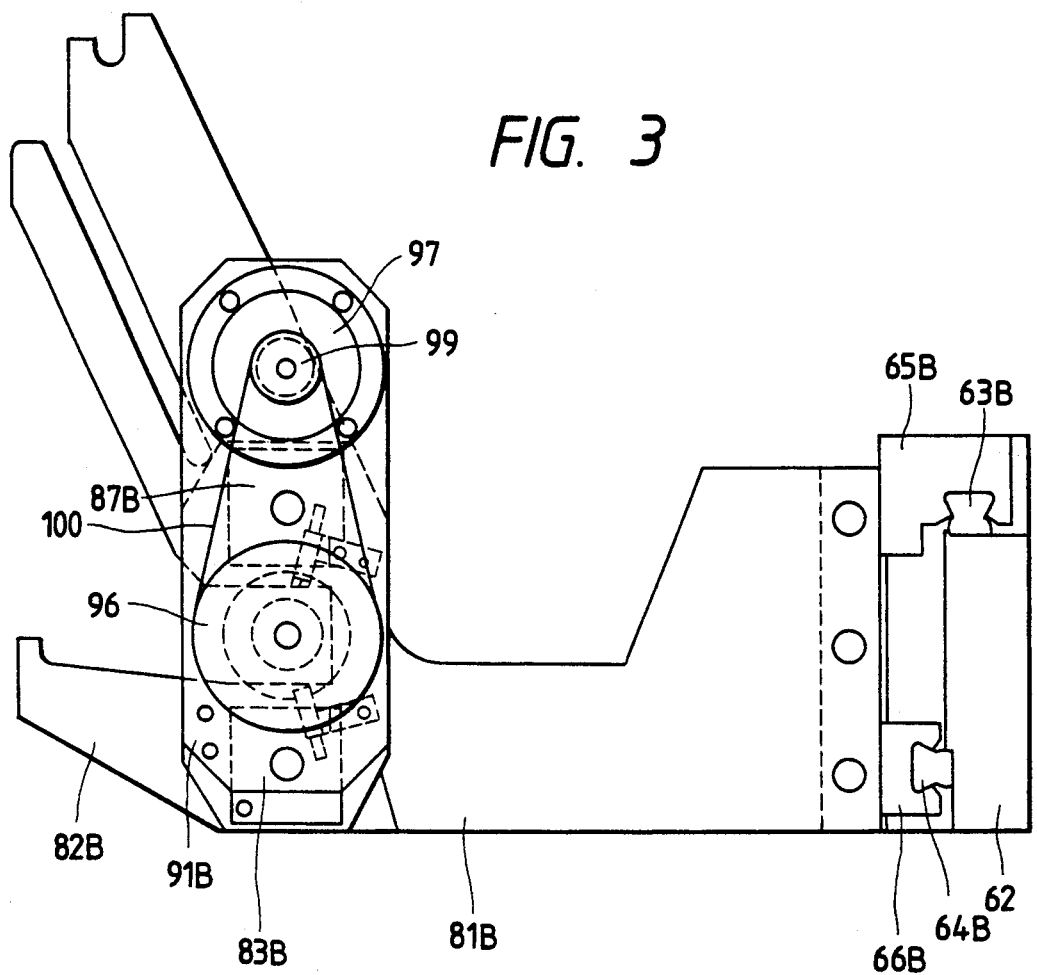
FIG. 3 is a partial view of then lower film supply section of the apparatus, seen from the right side of the front of the section.
Figure 4:
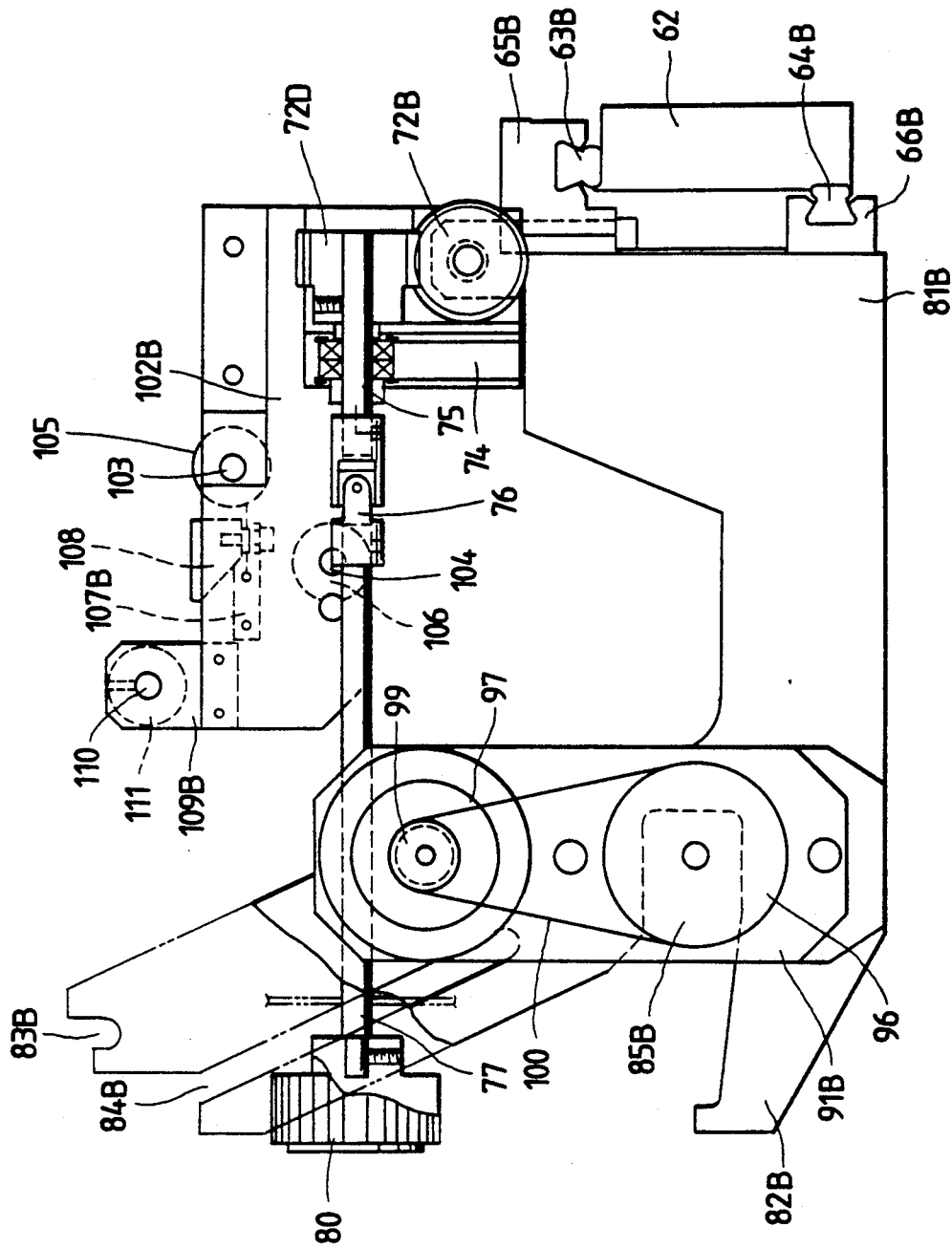
FIG. 4 is a detailed view of the lower film supply section seen from the right side of the front thereof.
Figure 5:
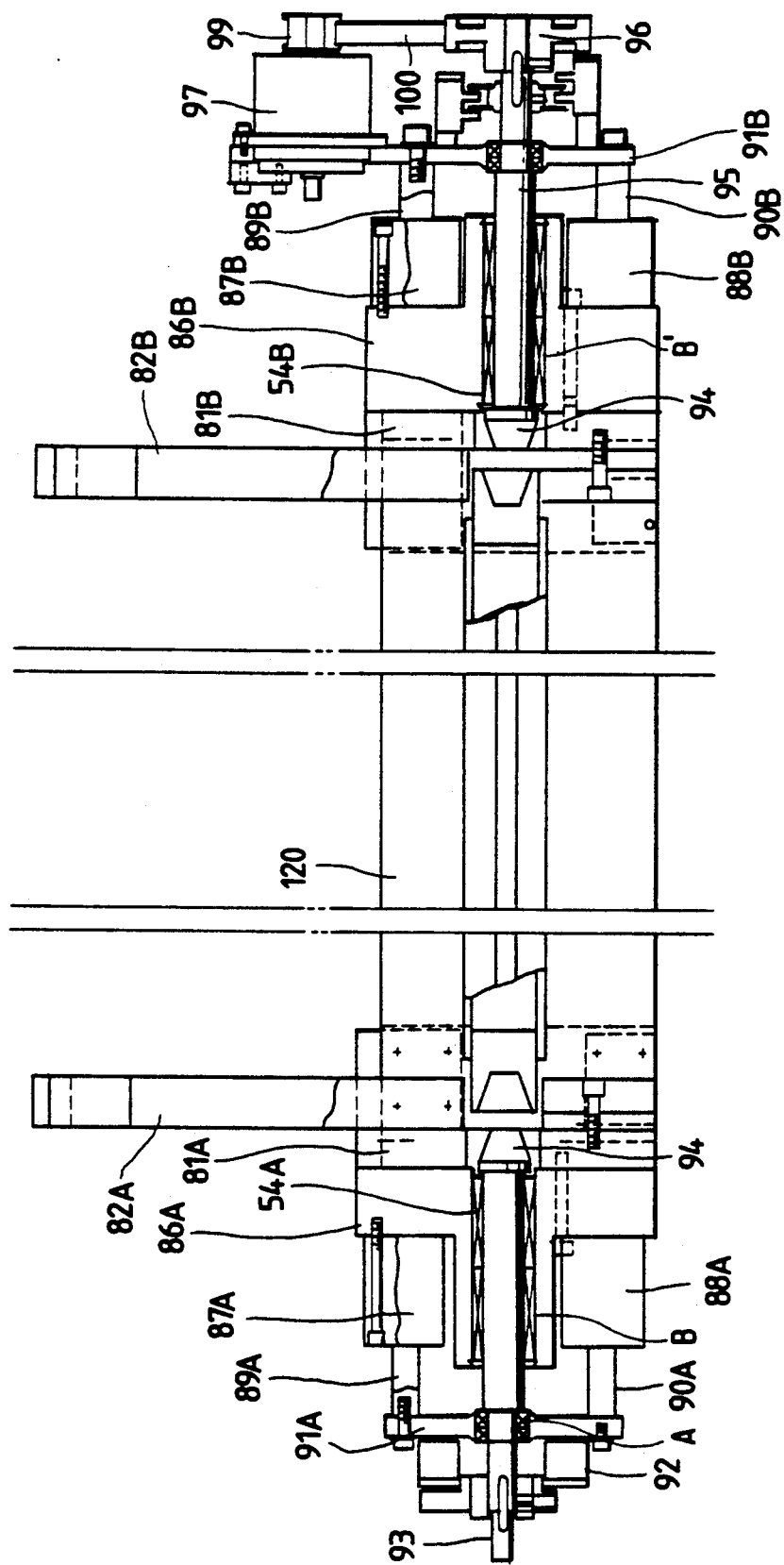
FIG. 5 is a sectional rear view of the lower film supply section.
Figure 6:
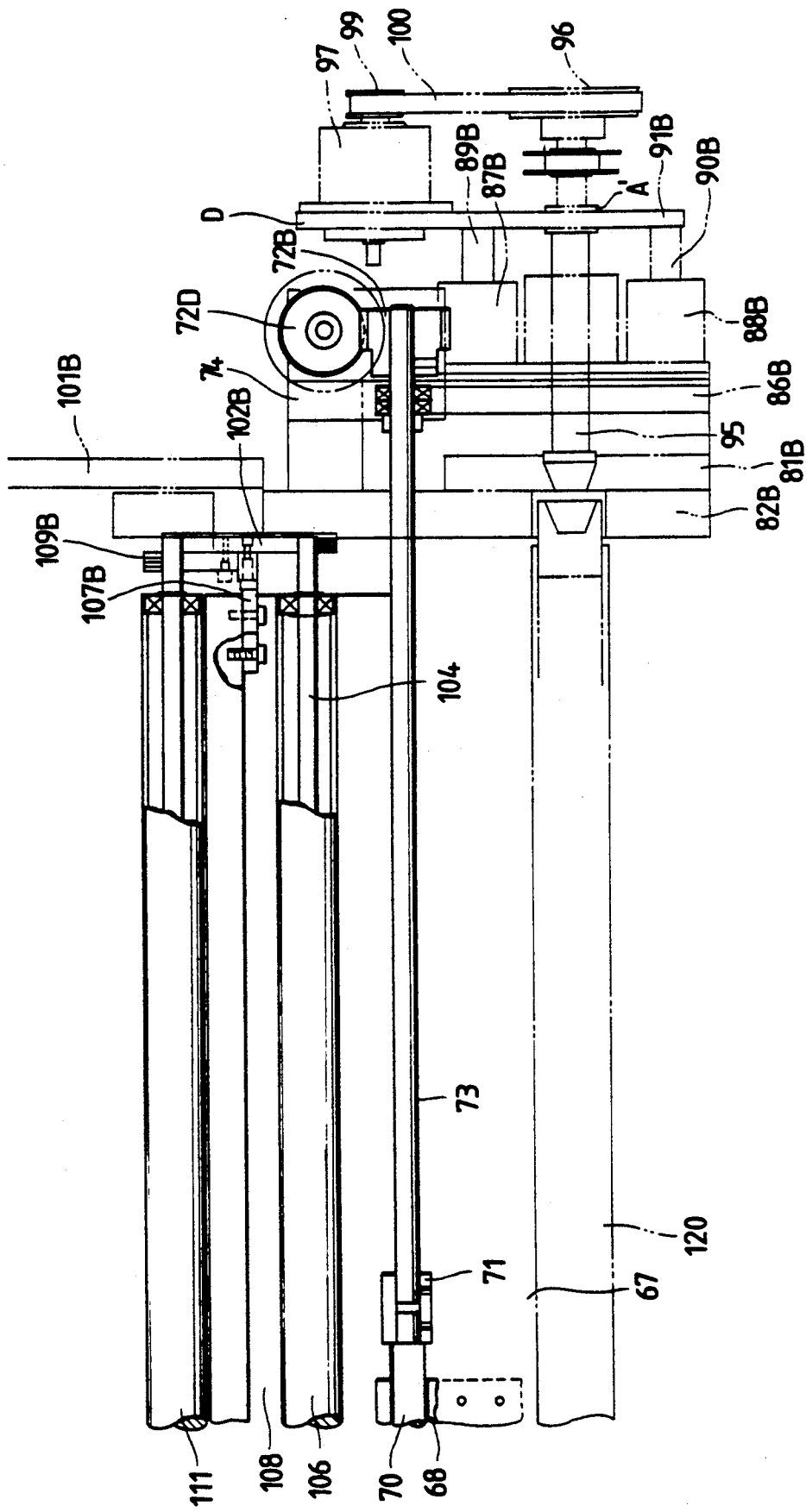
FIG. 6 is a detailed sectional rear view of the lower film supply section.
Figure 7:
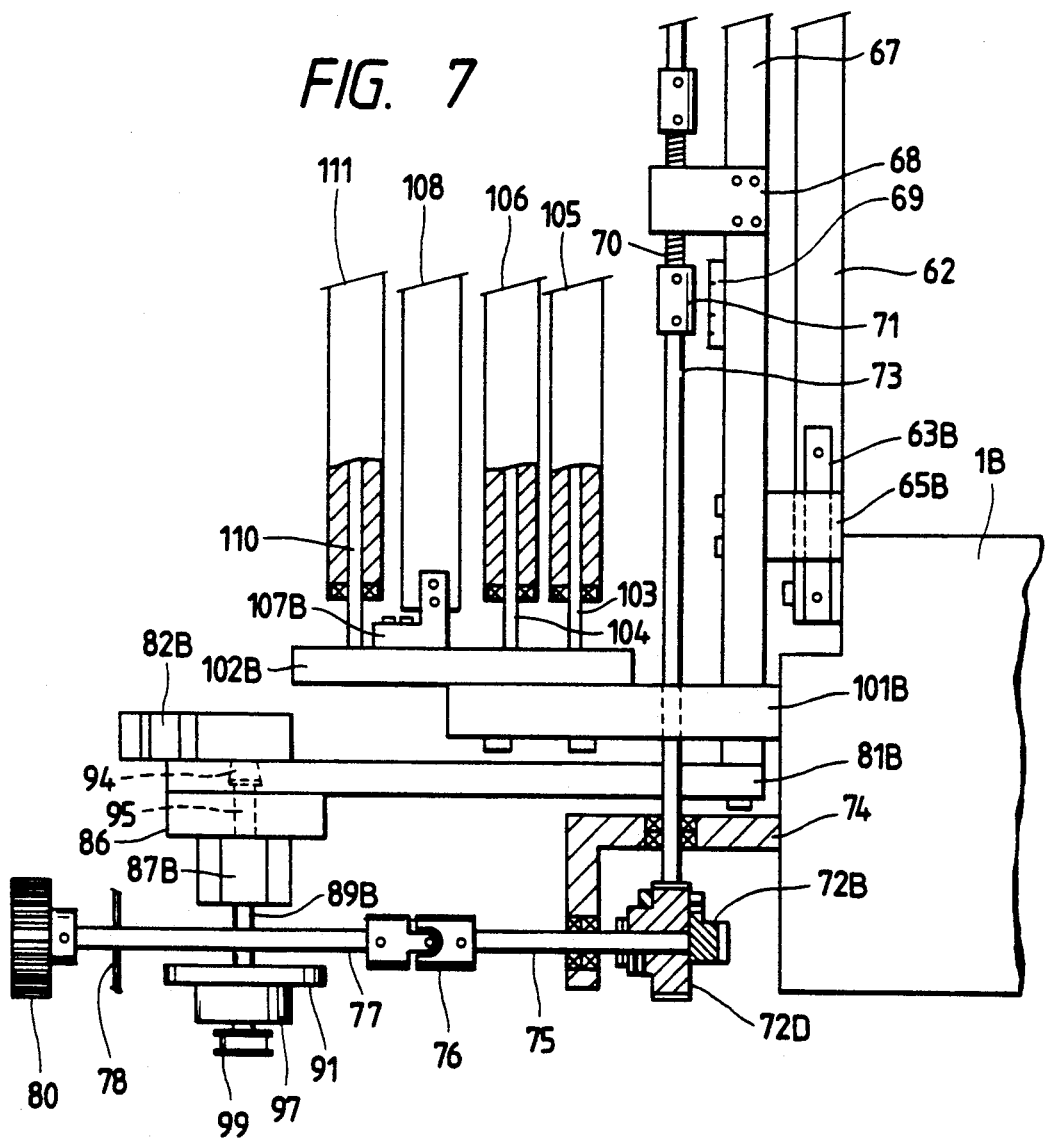
FIG. 7 is a longitudinally sectional top view of the lower film supply section.
Figure 8:
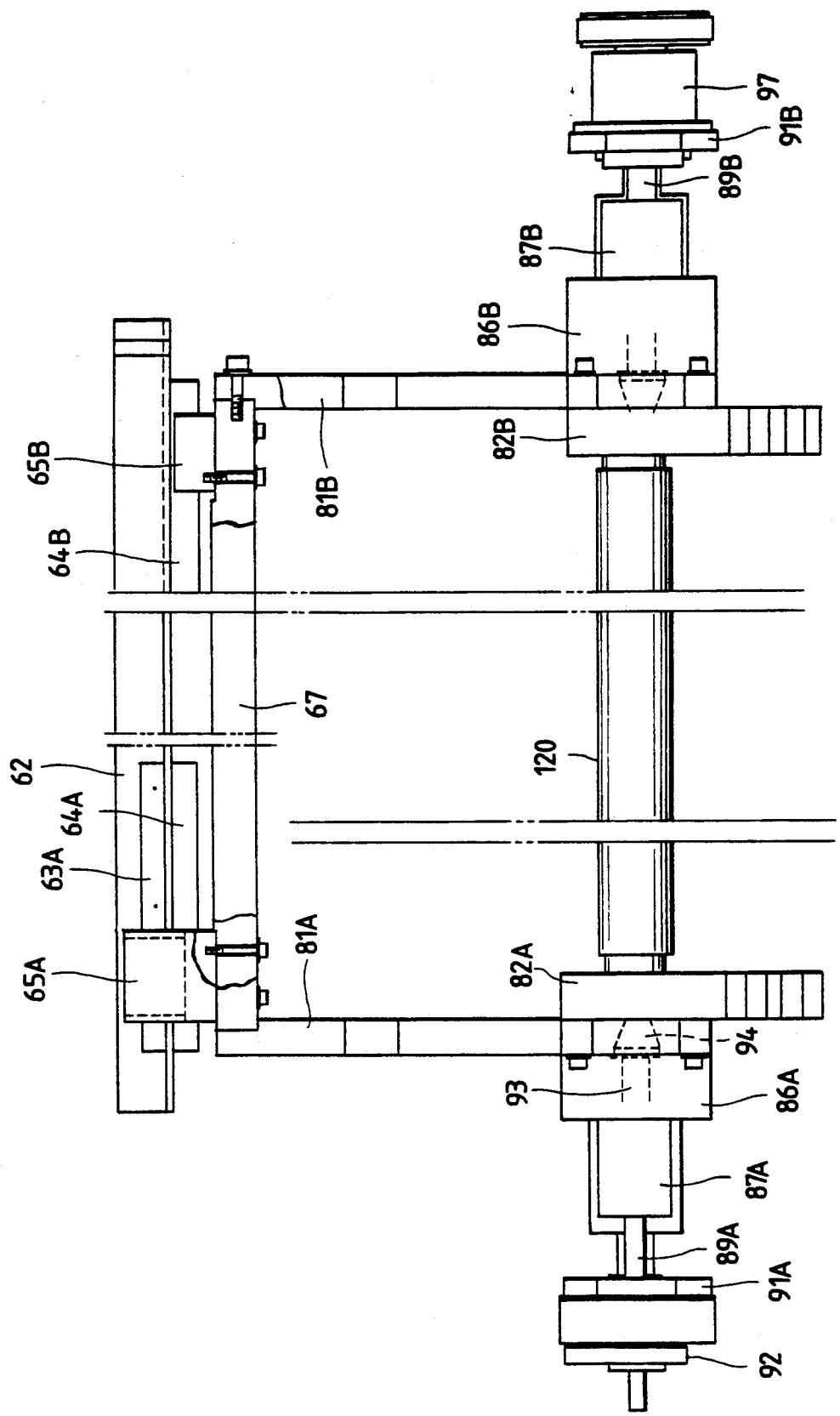
FIG. 8 is a partial plan view of the lower film supply section.
Figure 11:
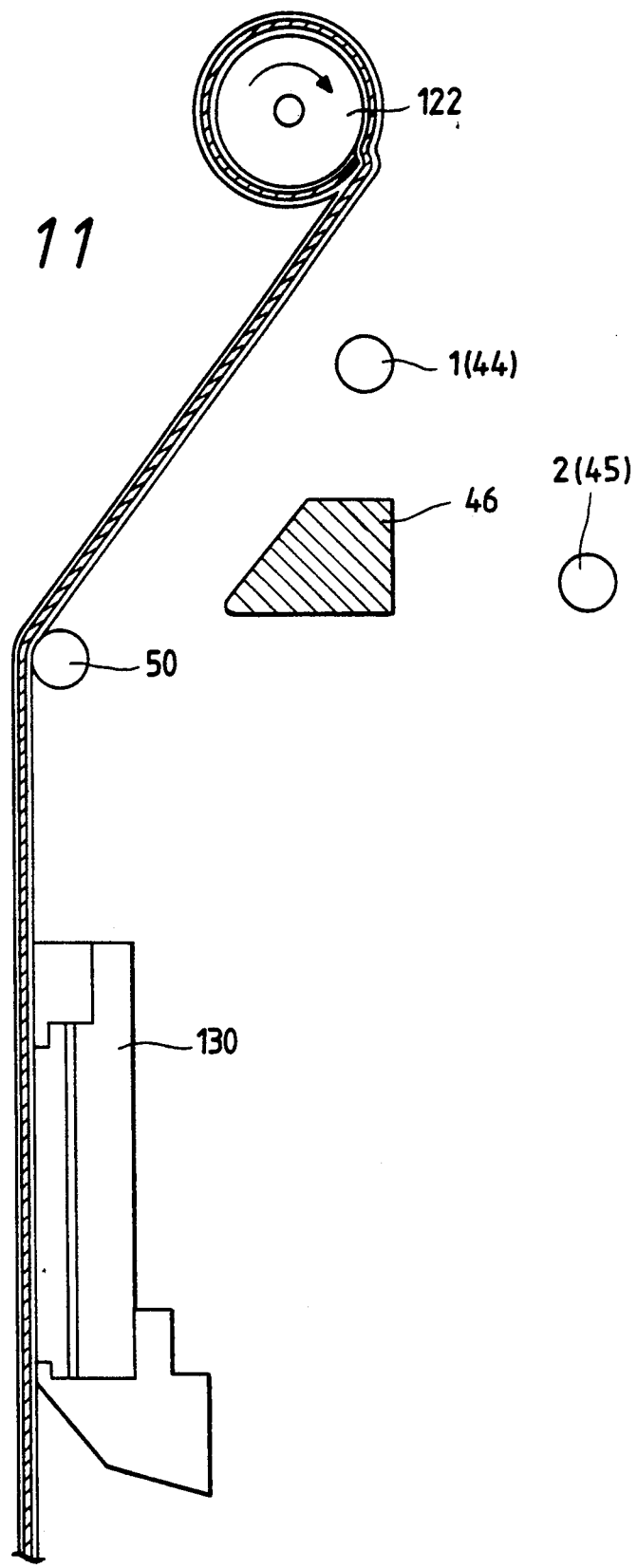
FIG. 11 is an explanatory view for explaining a passage for the stratified film in the positioning thereof.
Figure 12:
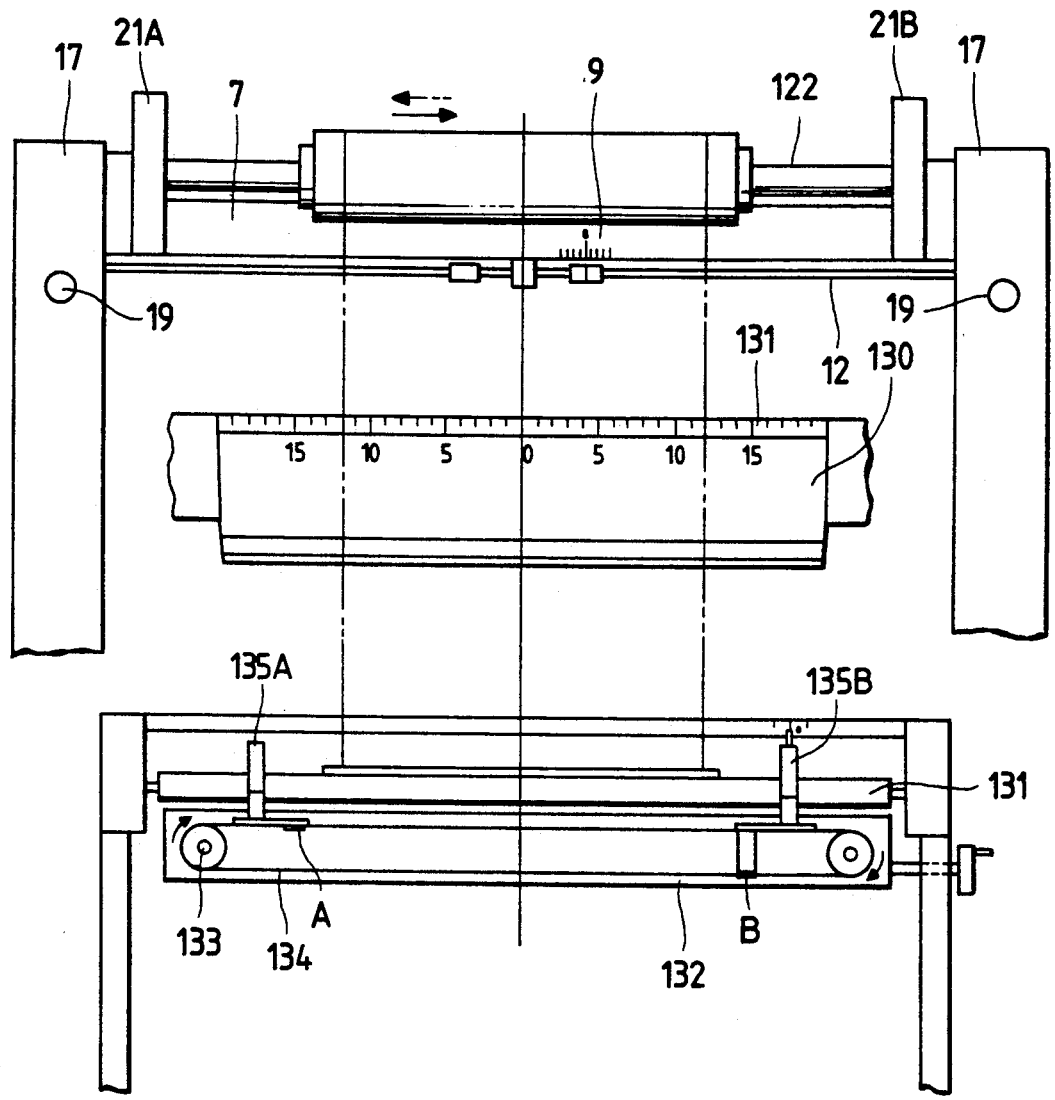
FIG. 12 is an explanatory view for explaining the positioning of the stratified film.
Figure 13:
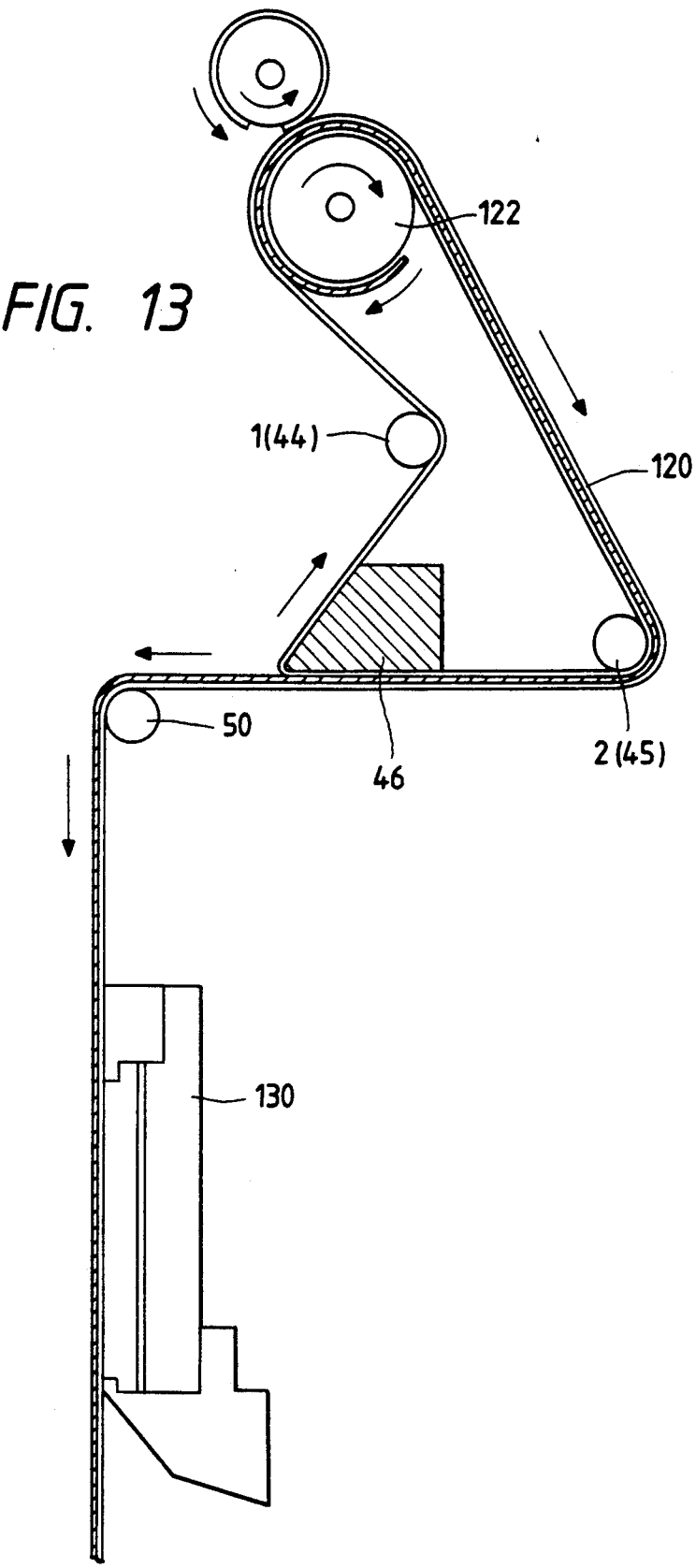
FIG. 13 is an explanatory view for explaining a passage for the stratified film in the normal use of the apparatus.
Figure 14:
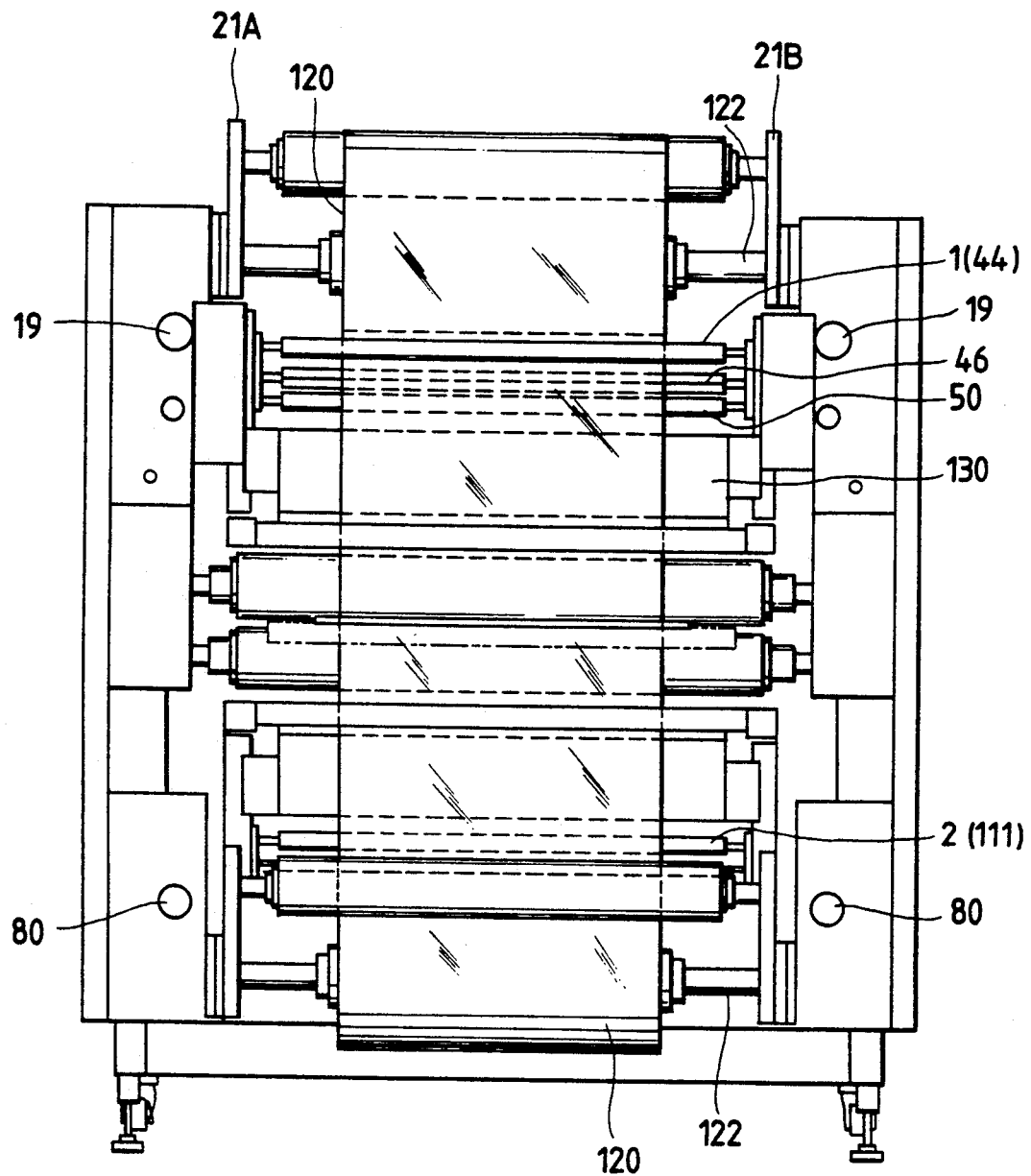
FIG. 14 is a front view of the apparatus as a whole.
Figure 15B:
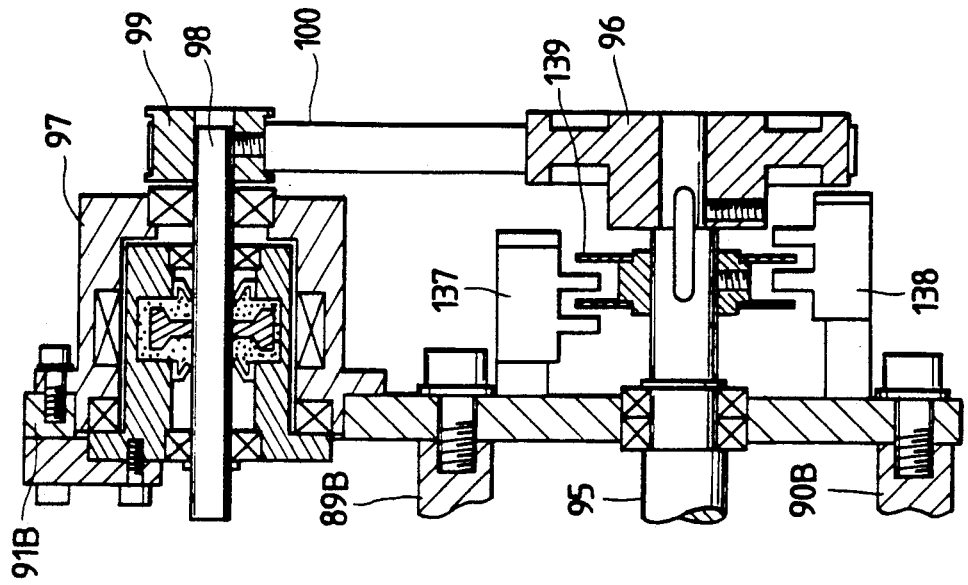
FIG. 15B is a view for explaining the constitution of a powder brake.
Figure 15A:
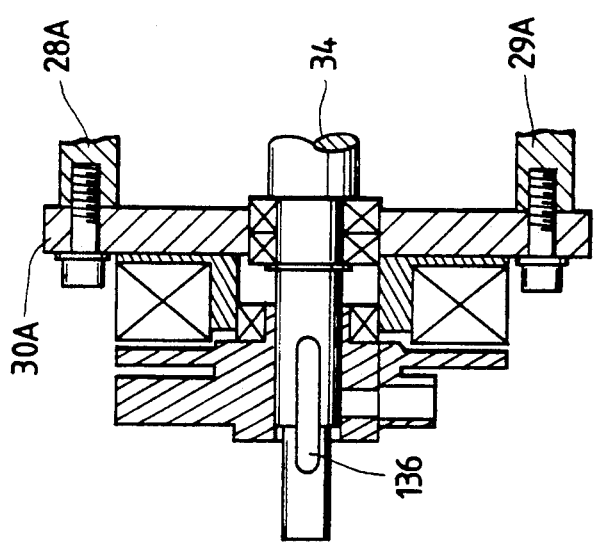
FIG. 15A is a sectional view for explaining the constitution of an electromagnetic brake.
Figure 16A:
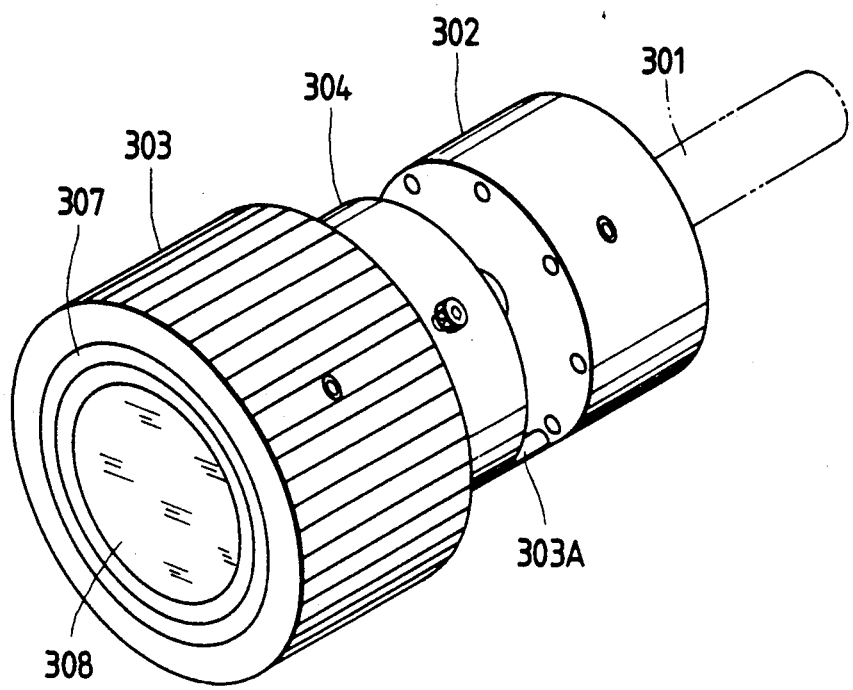
FIG. 16A is a perspective view for explaining the constitution of a rotary knob.
Figure 16B:
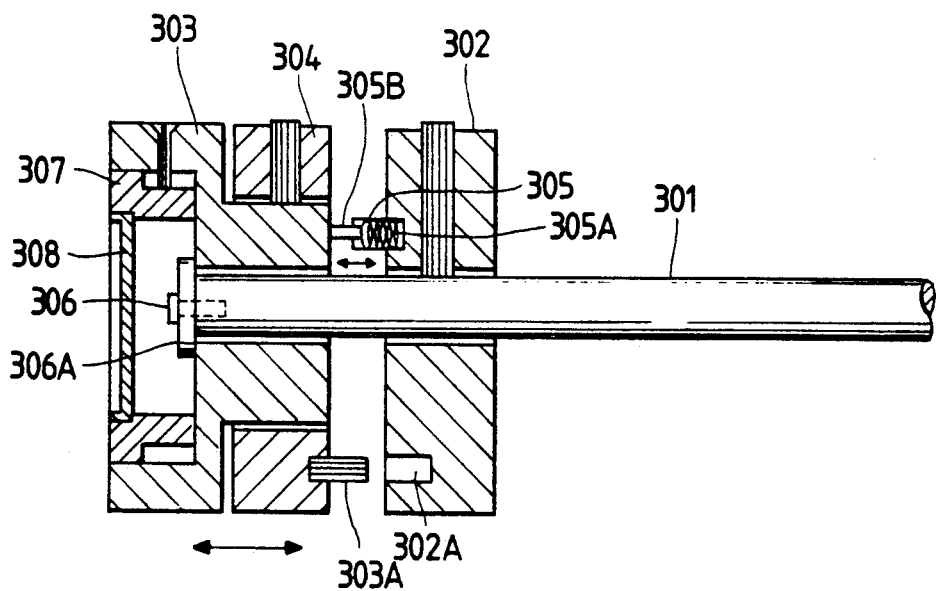
FIG. 16B is a sectional view of the rotary knob.
Figure 16C:
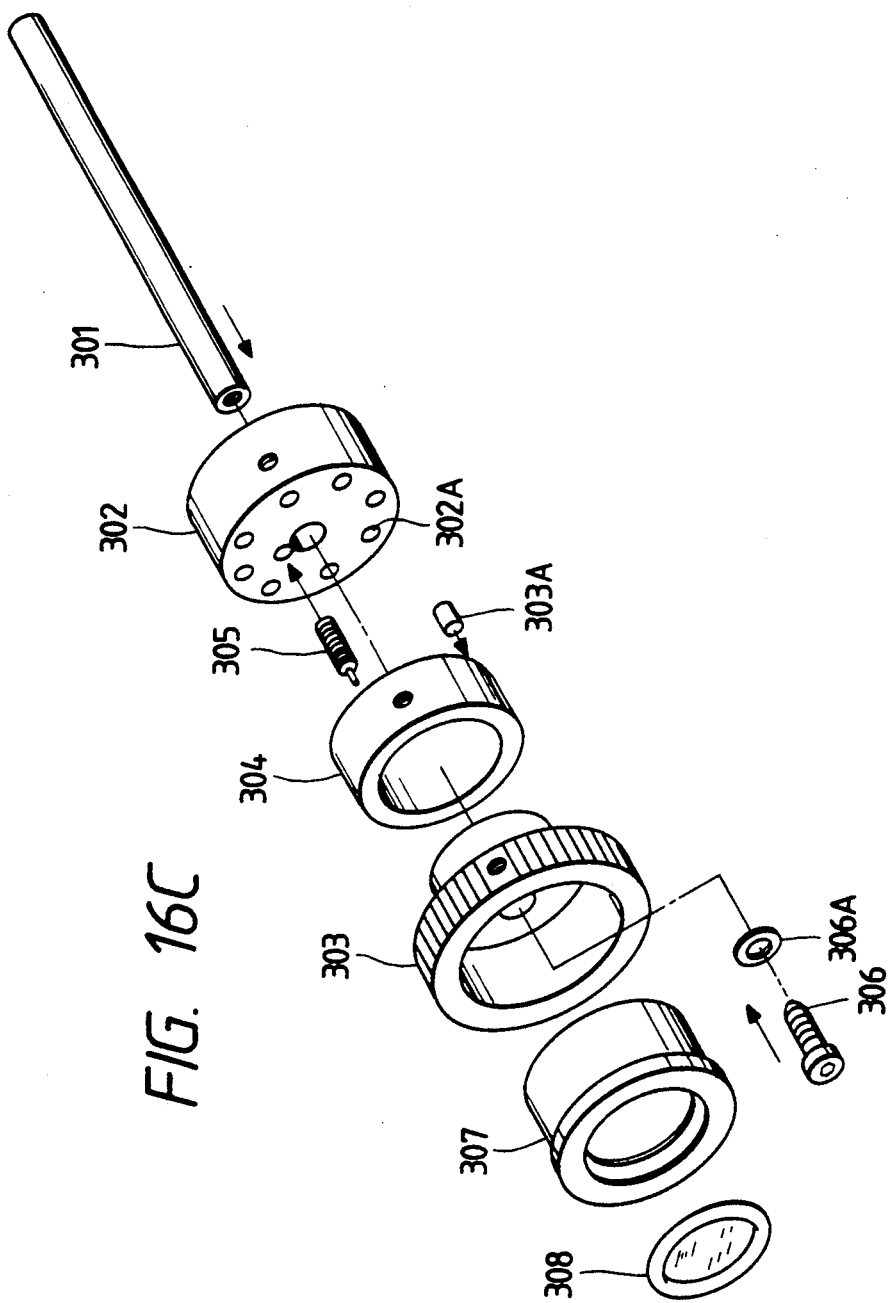
FIG. 16C is an exploded view of the rotary knob.
Figure 17:
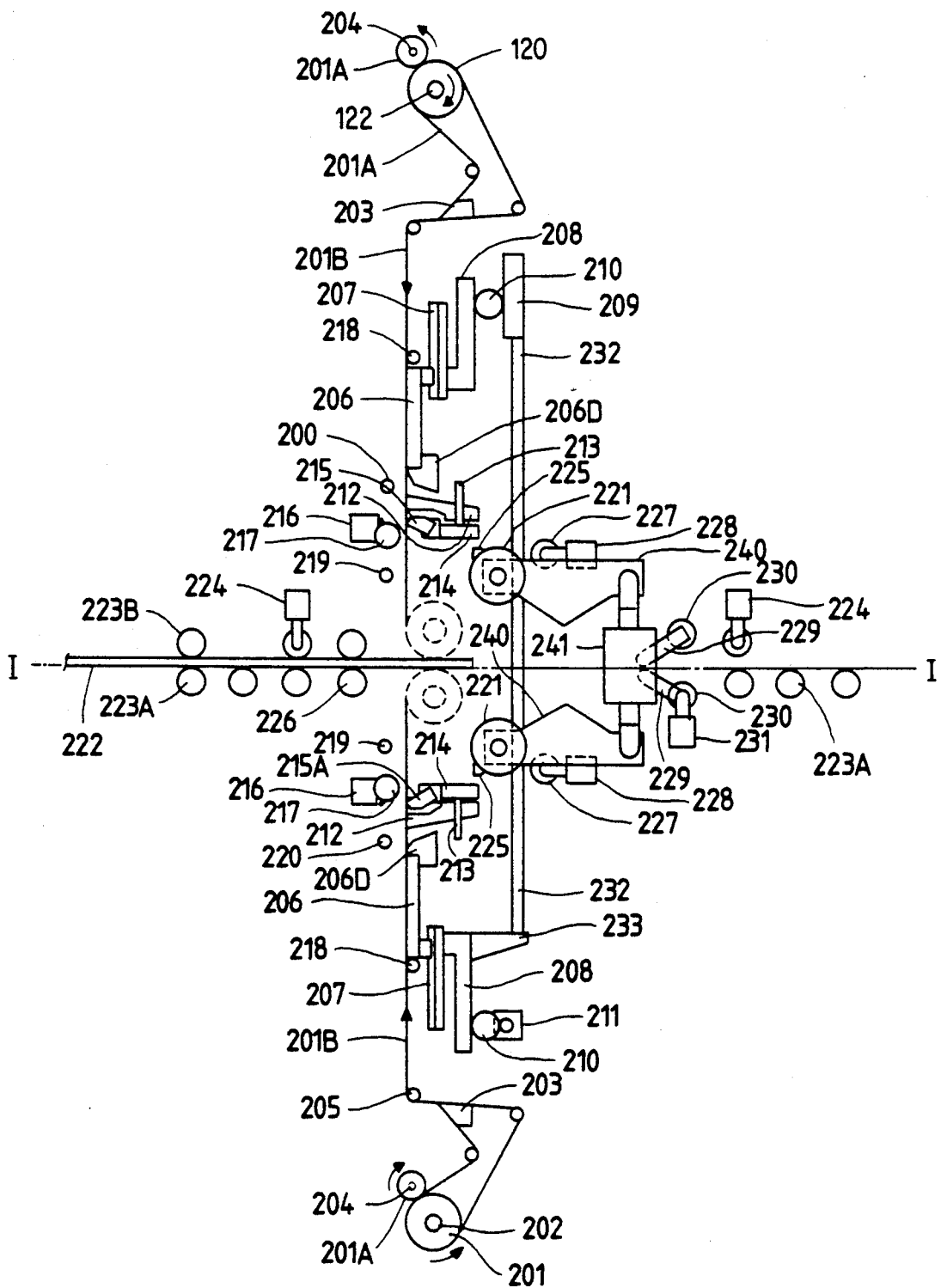
FIG. 17 is a schematic side view of the apparatus as a whole.

An embodiment of the present invention is hereafter described in detail with reference to the drawings attached hereto. FIG. 1 is a perspective view of the upper film supply section of a sticking apparatus of the preferred embodiment and by which stratified films each consisting of a photosensitive resin layer and a light-transmissible resin film are adhered, under heat and pressure, to the top and bottom of a panel for a printed circuit board. FIG. 2 is a view of the upper film supply section seen from the right side of FIG. 1. FIG. 3 is a partial view of the lower film supply section of the apparatus, seen from the right side of the front of the section. FIG. 4 is a detailed view of the lower film supply section seen from the right side of the front thereof. FIG. 5 is a rear sectional view of the lower film supply section. FIG. 6 is a detailed sectional view of the lower film supply section. FIG. 7 is a longitudinally sectional view of the lower film supply section seen downward. FIG. 8 is a partial plan view of the lower film supply section. FIG. 9 is an explanatory view for explaining the operation of the apparatus. FIG. 10 is a view showing that the stratified film is present on film supply roller. FIG. 11 is an explanatory view for explaining a passage for the stratified film in the positioning thereof. FIG. 12 is an explanatory view for explaining the positioning of the stratified film. FIG. 13 is an explanatory view for explaining a passage for the stratified film in the normal use of the apparatus. FIG. 14 is a front view of the apparatus as a whole. FIG. 15A is a sectional view for explaining in the constitution of an electromagnetic brake. FIG. 15B is a view for explaining the constitution of a powder brake. FIG. 16A is a perspective view for explaining the constitution of a rotary knob. FIG. 16B is a sectional view of the rotary knob. FIG. 16C is an exploded view of the rotary knob. FIG. 17 is a schematic side view of the apparatus as a whole.

The constitution of a rightward or leftward positioning movement mechanism for the upper film supply roller of the sticking apparatus is described with reference to FIGS. 1 and 2 from now on. The body of the apparatus has a left frame 1A and a right frame 1B. A coupling frame 2 is secured to the left and the right frames 1A and 2B by bolts and couples the left and the right frames to each other. Upper guide rails 3A and 3B are secured to the top of the coupling frame 2 at the left and right ends thereof by screws. Lower guide rails 4A and 4B are secured to the lower portion of the coupling frame 2 at the left and right ends thereof by screws. Upper brackets 5A and 5B are slidably fitted on the upper guide rails 3A and 3B. Lower brackets 6A and 6B are slidably fitted on the lower guide rails 4A and 4B. A different movement means such as a rack and pinion mechanism and a screw mechanism may be provided instead, to move the upper and the lower brackets 5A, 5B, 6A and 6B rightward or leftward.

An arm coupling member 7, by which arms 20A and 20B for attaching a left and a right supply roller support members 21A and 21B are coupled to each other, is secured to the rears of the upper and the lower brackets 5A, 5B, 6A and 6B by screws. A centering block 8 is secured to the central portion of the bottom of the arm coupling member 7 by a screw. A scale 9 is secured to the bottom of the arm coupling member 7 at the right of the center of the bottom (See FIG. 9). The centering block 8 has a tapped hole extending. A centering male screw 9A is inserted in the tapped hole. Couplings 10 are provided at the right and left ends of the centering screw 9A, and secured to the ends of the centering screw 9A and those of coupling shafts 12 by screws. Scale coincidence lines are marked on the central portions of the couplings 10 along the circumferences thereof. The coupling shafts 12 are connected to the couplings 10 at the outer ends thereof and to spiral gears 11A and 11B, and rotatably supported by coupling shaft support members 13 with bearings provided in the through holes of the members. The support members 13 are secured at one end of each thereof to the body frames 1A and 1B by screws. The upper spiral gears 11A and 11B are secured by screws to the coupling shafts 12 at the ends thereof opposite the couplings 10, and engaged with lower spiral gears 11C and 11D secured to lower spiral gear coupling shafts 14 at one end of each thereof by screws. Universal joints 15 are secured to the lower spiral gear coupling shaft 14 at the other ends thereof by screws. Rotary knob attaching shafts 16 are secured by screws to the universal joints 15 opposite the coupling shafts 14. The portion of the knob attaching shafts 16, which is located opposite the universal joints 15, project outward through the holes 18 of the cover 17 of the sticking apparatus. The rotary knobs 19 are attached to the projecting portions at the tips thereof by screws.

The coupling shaft 12 attached to the upper spiral gear 11A and the lower spiral gear coupling shaft 14 attached to the lower spiral gear 11C extend in directions which are at right angles to each other when seen from the top. The mutual engagement of the upper and the lower spiral gears 11A and 11C is preset so that the coupling shaft 12 is rotated when the rotary knob 19 is turned.

The film supply roller support members 21A and 21B are secured to the film supply roller support member attaching arms 20A and 20B by screws. The support members 21A and 21B have arc-shaped notched 22A and 22B in the uppermost portions of the members, U-shaped slits 23A and 23B in the upper portions of the members, and U-shaped notches 24A and 24B in the lower portions of the members. An upper protective film winding roller 204 shown in FIG. 17 is temporarily placed in the arc-shaped notches 22A and 22B in changing an upper stratified film for another. The U-shaped slits 23A and 23B serve as guide grooves to fit the protective film winding roller 204. The U-shaped notches 24A and 24B serve to support the upper film supply roller 202 shown in FIG. 17.

Pneumatic cylinder attaching blocks 25A and 25B are secured to the film supply roller support member attaching arms 20A and 20B at the front ends thereof by screws. Upper pneumatic cylinders 26A and 26B are secured to the upper portions of the blocks 25A and 25B by screws. Lower pneumatic cylinders 27A and 27B are secured to the lower portions of the blocks 25A and 25B by screws. Brake attaching member 30A and 30B are secured to the piston rods 28A, 28B, 29A and 29B of the upper and the lower pneumatic cylinders 26A, 26B, 27B and 27B at one end of each of the rods by screws. The left brake attaching member 30A has a through hole in the central portion of the member. The electromagnetic brake 31 is secured to the attaching member 30A by screws and covers the through hole. A brake shaft 32 is secured at one end thereof to the central portion of the brake 31 by a screw.

The pneumatic cylinder attaching blocks 25A and 25B have through holes in the central portions of the blocks. A plurality of bearings are provided on each of the inside surfaces of the blocks 25A and 25B in the through holes. The film supply roller support member attaching arms 20A and 20B have through holes C and C' in the central portions of the arms. The left brake shaft 32 extends through the holes A and B loosely thereto, and is shaped as a truncated cone at the tip thereof. When the piston rods 28A and 29A of the left pneumatic cylinders 26A and 27A are protruded farthest therefrom, the truncated-cone-shaped tip (not shown in the drawings) of the left brake shaft 32 is located in the through hole C of the film supply roller support member attaching arm 20A. When the piston rods 28A and 29A are slightly protruded from the cylinders 26A and 27A, the tip of the brake shaft 32 is located past the U-shaped notch 24A of the film supply roller support member 21A.

The upper portion of the right brake attaching member 30B has a through hole A'. A plurality of bearings are provided on the inside surface of the attaching member 30B in the hole A'. A film supply roller shaft holding shaft 34 extends through the hole A'. A large-diameter pulley 35 for a timing belt is secured to the holding shaft 34 at the right end thereof by a screw. The lower portion of the right brake attaching member 30B has a through hole D in which the powder brake 36 having a rotary shaft 37 is inserted. The attaching member 30B and the powder brake 36 are secured to each other by screws. A small-diameter pulley 38 for the timing belt is secured to the rotary shaft 37 by a screw. The timing belt 39 is engaged on the large-diameter pulley 35 and the small-diameter pulley 38.

Guide roller support member attaching members 40A and 40B are secured to the left and right frames 1A and 1B of the body of the apparatus by bolts. Left and right guide roller support members 41A and 41B are secured to the attaching members 40A and 40B at the upper ends thereof. Roller shafts 42 and 43 are secured to the guide roller support members 41A and 41B at the upper ends thereof and the central portions of the lower ends thereof by screws so that the members are coupled to each other by the shafts. Guide rollers 44 and 45 are rotatably supported by the roller shafts 42 and 43 with bearings provided near the ends thereof.

Left and right film separation member attaching arms 44A and 44B are secured to the guide roller support members 41A and 41B by screws. A film separation member 46 is secured to the arms 44A and 44B by screws so that the arms are coupled to each other at one end of each thereof.

Fulcrum shafts 47A and 47B are secured to the guide roller support members 41A and 41B at the lower ends thereof by screws, and extend through the holes of tension roller support members 48A and 48B at one end of each of the shafts. The tension roller support members 48A and 48B are rotatably supported by the fulcrum shafts 47A and 47B. A tension roller shaft 49 is secured to the tension roller support members 48A and 48B by screws so that the members are coupled to each other at one end of each thereof. A tension roller 50 is rotatably supported by the tension roller shaft 49 with bearings provided at both the ends thereof. The hooks of tension springs 51A and 51B for the tension roller 50 are secured by screws to the tension roller support members 48A and 48B at the ends thereof opposite the tension roller shaft 49. The opposite hooks of the springs 51A and 51B are secured to the guide roller support member attaching members 40a and 40B by screws.

Stopper attaching members 52A and 52B are secured to the guide roller support members 41A and 41B at the lower ends thereof by screws. Stoppers 53A and 53B for the tension roller support members 48A and 48B are secured to the lower portions of the stopper attaching members 52A and 52B by screws.

The constitution of a rightward or leftward positioning movement mechanism for the lower film supply roller of the sticking apparatus is described with reference to FIGS. 3, 4, 5, 6, 7 and 8 from now on. A coupling frame 62 is secured to the left and right frames 1A and 1B of the body of the apparatus by bolts, and couples the left and the right frames to each other. Upper guide rails 53A and 63B are secured to the top of the coupling frame 62 at the left and right ends thereof by screws. Lower guide rails 64A and 64B are secured to the lower portions of the coupling frame 62 at the left and right ends thereof by screws.

Upper brackets 65A and 65B are slidable fitted on the upper guide rails 63A and 63B. Lower brackets 66A and 66B are slidable fitted on the lower guide rails 64A and 64B. The upper and the lower brackets 65A, 65B, 66A and 66B are secured by screws to the rear of an arm coupling member 67 which couples a left and a right film supply roller support member attaching arms 81A and 81B to each other. A centering block 68 is secured to the lower portion of the arm coupling member 67 at the center thereof by screws. A scale 69 is secured to the upper portion of the arm coupling member 67 at the right of the center thereof by screws (See FIG. 7). The centering block 68 has a through tapped hole extending rightward or leftward through the block. A centering male screw 70 is inserted in the through tapped hole of the block 68. Couplings 71 are provided at the right and left ends of the screw 70. Scale coincidence lines are marked on the central portions of the couplings 71 along the circumferences thereof. Coupling shafts 73 are connected at one end of each thereof to the couplings 71 and at the other end thereof to lower spiral gears 72A and 72B, and rotatably supported by coupling shaft support embers 74 with bearing provided in the through holes thereof. The support members 74 are secured at one end of each thereof to the body frames 1A and 1B by screws. The lower serial gears 72A and 72B are secured by screws to the coupling shafts 73 at the ends thereof opposite the couplings 71, and engaged with upper spiral gears 72C and 72D secured to upper spiral gear coupling shafts 75 by screws. A universal joint 76 is secured by a screw to the upper spiral gear coupling shaft 75 at the end thereof opposite the upper spiral gear 72D. A rotary knob attaching shaft 77 is secured by a screw to the universal joint 76 at the end thereof opposite the coupling shaft 75. The portion of the rotary knob attaching shaft 77, which is located opposite the universal joint 76, projects outward through the ole 76 of the cover 78 of the sticking apparatus. The rotary knob 80 is attached to the projecting portion at the tip thereof by a screw. The coupling shaft 73 fitted with the lower spiral gear 72B and the upper spiral gear coupling shaft 75 fitted with the upper spiral gear 72D extend in directions which rectangularly cross with each other when seen downward. The mutual engagement of the lower and the upper spiral gears 72B and 72D is preset so that the coupling shaft 73 is rotated by turning the rotary knob 80.

The constitution of each of the rotary knobs 19 and 80 is described in detail with reference to FIGS. 16A, 16B and 16C from now on. An attaching block 302 is secured to each of the rotary knob attaching shafts 16 and 77 which are often denoted by 301 hereinafter. The attaching block 302 is for rotating the attaching shaft 301, and has a plurality of coupling holes 302A in the coupling surface of the attaching block near the peripheral surface thereof. An engagement pin 303A for coupling the attaching block 302 to the rotary knob 303 is fitted in one of the coupling holes 302A. A knob securing ring 304 is secured to the knob 303 at the peripheral portion thereof by a screw, and has through hole which is provided in the central portion of the ring and slightly larger in diameter than the attaching shaft 301 which extends through the hole so that the knob 303 and ring 304 are slidable and rotatable relative to the attaching shaft. A spring 305A is provided in a spring housing member 305 secured to the attaching block 302 by being screwed into it. A movable member 305B is secured to the spring 305A at the tip thereof. The knob 303 is held at the tip of the attaching shaft 301 by the resilient force of the spring 305A and a washer 306A secured to the shaft at the tip thereof by a screw 306. The engagement pin 303A is planted in the ring 304. An ornamental ring 307 is fitted in the knob 303 at one end thereof and secured thereto by a screw engaged in the tapped hole of the peripheral portion of the knob 303 is turned as the engagement pin 303A remains fitted in the coupling hole 302A by pushing the knob with a hand, the rotary knob attaching shaft 301 is rotated. When the knob 303 is turned as the engagement pin 303A remains not fitted in the coupling hole 302A by pushing the knob with the hand, the attaching shaft 301 is not rotated. In that case, the knob 303 is only rotated about the shaft 301 relative thereto.

Film supply roller support members 82A and 82B are secured to the film supply roller support member attaching arms 81A and 81B at the tips thereof by screws. The support members 82A and 82B have arc-shaped notched 83A and 83B in the uppermost portions of the members, U-shaped slits 84A and 84B in the upper portions of the members, and U-shaped notches 85A and 85B in the lower portions of the members. A lower protective film winding roller 204 shown in FIG. 17 is temporarily placed in the arc-shaped notches 83A and 83B in changing a lower stratified film for another. The U-shaped recesses 84A and 84B serve as guide grooves to fit the protective film winding roller 204. The U-shaped notches 85A and 85B serve to support the lower film supply roller 202 shown in FIG. 17.

Pneumatic cylinder attaching blocks 86A and 86B are secured to the film support roller support member attaching arms 81A and 81B at the tips thereof by screws. Upper pneumatic cylinders 87A and 87B are secured to the upper portions of the attaching blocks 86A and 86B by screws. Lower pneumatic cylinders 88A and 88B are secured to the lower portions of the attaching blocks 86A and 86B by screws. The piston rods 89A and 89B of the cylinders 87A and 87B and the piston rods 90A and 90B of the other cylinders 88A and 88B are secured at one end of each of the rods to brake attaching members 91A and 91B by screws. The left brake attaching member 91A has a through hole A in the central portion of the member. The electromagnetic break 92 is secured to the attaching member 91A and covers the through hole A. A brake shaft 93 is secured at one end thereof to the central portion of the brake 92 by screws.

The central portions of the pneumatic cylinder attaching blocks 86A and 86B have through holes B and B'. A plurality of bearings 54A and 54B are provided on the inside surfaces of the attaching blocks 86A and 86B in the through holes B and B'. The central portions of the roller support member attaching arms 81A and 81B have through holes C and C'. The left brake shaft 93 extends through the through holes A and B loosely thereto, and is shaped as a truncated cone at the tip 94 of the shaft. When the piston rods 89A and 90A of the left pneumatic cylinders 87A and 88A are protruded farthest therefrom, the truncated-cone-shaped tip 94 of the left brake shaft 93 is located in the through hole C of the roller support member attaching arm 81A. When the piston rods 89A and 90A of the left pneumatic cylinders 87A and 88A are slightly protruded therefrom, the truncated-cone-shaped tip 94 of the left brake shaft 93 is located past the U-shaped notch 85A of the toller support member 82A.

The lower portion of the right brake attaching member 91B has a through hole A'. A plurality of bearings are provided on the inside surface of the attaching member 91B in the through hole A'. A film supply roller shaft holding shaft 95 extends through the hole A, A large diameter pulley 96 for a timing belt 100 is secured to the holding shaft 95 at the right end thereof by a screw. The upper portion of the right brake attaching member 91B has a through hole D in which the powder brake 97 having a rotary shaft 98 is inserted. The brake attaching member 91B and the powder brake 97 are secured to each other by screws. A small-diameter pulley 99 for the timing belt 100 is secured to the rotary shaft 98 of the powder brake 97 by a screw. The timing belt 100 is engaged on the large-diameter pulley 96 and the small-diameter pulley 99.

Guide roller support member attaching members 101A and 101B are secured to the body frames 1A and 1B of the sticking apparatus by bolts. Left and right guide roller support members 102A and 102B are secured to the attaching members 101A and 101B at the lower ends thereof by screws. Roller shafts 103 and 104 are secured to the left and the right guide roller support members 102A and 102B by screws, and couple them to each other at the central portions of the upper ends of the members and at the lower portions thereof. Guide rollers 105 and 106 are rotatably supported by the roller shafts 103 and 104 with bearings provided at both the ends of the shafts.

Left and right film separation member attaching arms 107A and 107B are secured to the guide roller support members 102A and 102B at the upper ends thereof by screws. A film separation member 108 is secured to the attaching arms 107A and 107B by screws, and couples the arms to each other at one end of each thereof. Tension roller support members 109A and 109B are secured to the guide roller support members 102A and 102B at the upper ends thereof by screws. A tension roller shaft 110 is secured to the tension roller support members 109A and 109B by screws, and couple the members to each other at the central portions thereof. A tension roller 111 is rotatably supported by the tension roller shaft 110 with bearings provided at both the ends thereof. The operation of the film supply roller rightward or leftward positioning movement mechanism of the sticking apparatus is described with regard to the upper film supply roller, for example, from now on. To position the upper film supply roller 122 rightward or leftward, the roller is put inside on the stratified film 120 and then tightened with core chucks 121 at both the side edges of the film as shown in FIG. 10. At that time, the film 120 is secured so that the center of the width of the film is located nearly at that of the length of the roller 122. The right or left rotary knob 19 is then turned so that the roller support member attaching arms 20A and 20B to which the roller support members 21A and 21B are secured and the arm coupling member 7 to which the arms are secured are set in the center positions thereof with regard to the width of the front of the sticking apparatus. Since a mark is provided on the arm coupling member 7, the setting can be easily performed. When the rotary knob 19 is turned by one revolution, the arm coupling member 7 is linearly moved by 1 mm in a direction corresponding to that of the turning.

A procedure of moving the stratified film 120 rightward, for example, is described with reference to FIG. 9 from now on. The right or left rotary knob 19 is first turned clockwise as shown by a full-line arrow in FIG. 9. The torque of the knob 19 is transmitted to the upper spiral gear 11B through the rotary knob attaching shaft 16, the universal joint 15 and the upper spiral gear coupling shaft 14. The torque is further transmitted to the lower serial gear 11D directly engaged with the upper spiral gear 11B, so that the torque is transmitted to the centering screw 9A through the coupling shaft 12 and the coupling 10 in that order, as shown by full-line arrows in FIG. 9. Since the centering screw 9A is a male screw and inserted in the tapped hole of the centering block 8, the block is moved rightward when the screw is rotated in a direction shown by a full-line arrow in FIG. 9. If the rotary knob 19 is turned counterclockwise as shown by a dotted-linea row in FIG. 9, the centering block 8 is moved leftward because the centering screw 9A is rotated in a direction shown by a dotted-line arrow in FIG. 9. Since the centering block 8 is secured to the arm coupling member 7 slidably fitted on the guide rail of the coupling frame, the arm coupling member is moved rightward at the time of the rightward movement of the block. At that time, the stratified film 120 is moved rightward because the roller support members 21A and 21B supporting the film supply roller 122 to which the film is secured are secured to the arm coupling member 7. When a film changing push button (not shown in the drawings) is pressed after both the end portions of the film supply roller 122 to which the film 120 is secured are put on the roller support members 21A and 21B in the U-shaped notches 24A and 24B thereof, the piston rods 28A, 28B, 29A and 29B of the upper and the lower pneumatic cylinders 26A, 26B, 27A and 27B secured to the cylinder attaching blocks 25A and 25B are retracted so that the brake attaching member 30A attached to the piston rods 28A and 29A and the other brake attaching member 30B attached to the other piston rods 28B and 29B are moved toward the upper and the lower pneumatic cylinders. The film supply roller 122 is thus set by the truncated-cone-shaped tips 33 of the film supply roller shaft holding shafts 34 supported with bearings 54A and 54B by the brake attaching members 30A and 30B, so that the film 120 is preset. The present film is then pulled out to the position of a main vacuum section plate 130 as shown in FIG. 11.

The main vacuum suction plate 130 is provided with a film setting scale 131 as shown in FIG. 12. The center of the length of the plate 130 is located at that of the width of the sticking apparatus so that the center zero point of the scale 131 serves as a mark for the center of the width of the apparatus. The pulled-out film 120 is finally set through referring to the graduations of the film setting scale 131, so that the center of the width of the film coincides with that of the length of the main vacuum suction plate 130. Since the center of the width of the film 120 nearly coincides with that of the length of the film supply roller 122 when the roller is set as described above, the length by which the film is moved while referring to the graduations of the scale 131, is so small that the movement of the film can be easily performed by finely turning the rotary knob 19. Besides, since the roller 122 is straightly moved rightward or leftward by 1 mm by turning the knob 19 by one round, the movement of the film 120 is more easily performed. Since the arm coupling member 7 is provided with the film supply section setting scale 9, the length by which the center of the width of the film 120 should be moved to that of the length of the other scale 131 if necessary can be confirmed. Since the rotary knob 19 can be manipulated by a low force to move the film supply roller section as a whole through the gears, a mechanism for locking the shaft of the rotary knob may be provided if the knob is likely to be unexpected touched to be turned.

When the sticking apparatus is in use, the film 120 is fed as shown in FIG. 13. The center of the width of the film 120 can be easily and quickly made coincident with that of the length of the scale 131 if the film is pulled out as shown in FIG. 11. After the coincidence is attained, the film is fed as shown in FIG. 13.

The upper and the lower film supply rollers 122 are set as described above. FIG. 14 is a front view of the whole sticking apparatus having the rollers 122 already set.

As shown in FIG. 12, the panel conveyor of the sticking apparatus is provided with a mechanism for centering the panel conveyed by the conveyor. The centering mechanism is briefly described from now on. A centering driver support member 132 is provided under a conveyance roller 131 and slidably fitted on the body of the panel conveyor. A centering pin drive motor 133 is attached to the centering driver support member 132 at the left end thereof. A pulley is secured to the shaft of the motor 133. Another pulley is rotatably attached the support member 132 at the right end thereof. A centering pin drive belt 134 is engaged on both the pulleys. A left centering pin 135A is secured to the portion A of the belt 134. A right centering pin 135B is secured to the other portion B of the belt 134. When the conveyed base pate is detected by a sensor (not shown in the drawings), the centering pin drive motor 133 is rotated in a direction as shown by an arrow in FIG. 12, so that the left and the right centering pins 135A and 135B are moved to the center positions thereof to center the panel. When the panel is thus centered, both the side edges of the panel are detected by other sensors attached to the centering pins 135A and 135B but not shown in the drawings, so that the centering is finished and the motor 133 is rotated in reverse to put the centering mechanism back into the original position thereof. The centering driver support member 132 can be preset with a center moving handle so as to change the position of the center of the width of the centered panel. The center of the width of the panel and that of the width of the stratified film 120 can thus be easily made either coincident with each other or incoincident with each other by a required length.

The electromagnetic brake 31 is briefly described with reference to FIG. 15A from now on. The brake 31 includes a rotary portion and a fixed portion. The rotary portion is secured to the film supply roller shaft holding shaft 34 by a key 136. The fixed portion includes an electromagnetic coil and an electromagnetic brake attaching member which is secured to the brake attaching member 30A by screws. When pulling out the stratified film 120 from the film supply roller 122 is completed, the electromagnetic brake 31 is put into action to prevent the film from loosening, or the like, due to the inertial force of the film in the pulling-out thereof, to maintain the tension of the film. The timing of the application of the brake 30 is determined by detecting the stoppage of the rotation of a light blocking pate 139 through sensors 137 and 138. The light blocking plate 139 has slits at regular intervals in a radial manner so that the slits are detected by the sensors 137 and 138 for control.

The powder brake 97 is briefly described with reference to FIG. 15B from now on. The powder brake 97 includes an input portion, an output shaft and a bracket. When an exciting current is caused to flow through the electromagnetic coil of the powder brake 97, a magnetic iron powder is bound together as a solid substance in a gap on a rotor by the intense magnetic flux of the coil so that torque is transmitted through the powder. Since the magnitude of the transmitted torque and that of the exciting current are nearly proportional to each other, the torque can be easily controlled. When a width selection switch not shown in the drawings is preset depending on a film supply roller width present for the film supply roller 122 and the roller is then set in the stocking apparatus, the diameter of the roller is detected by a sensor provided in the film supply section of the apparatus but not shown in the drawings. The eliciting current is controlled on the basis of information width and diameter of the film supply roller so as to keep the transmitted torque of the powder brake constant to maintain the film under constant tension. Although there would be a problem that the transmitted torque of the powder brake 97 could become unstable at the low rotational frequency thereof, the problem is solved by combining the large-diameter pulley 96 and the small-diameter pulley 99 with each other in the embodiment.

The constitution of the sticking apparatus as a whole is briefly described from now on. FIG. 17 is a side view of the sticking apparatus and is also for explaining how the stratified films 201 are fed in the apparatus. In the apparatus, the stratified film roll 120 consisting of the light-transmissible resin film, the photosensitive resin layer and another light-transmissible resin film are continuously wound on the film supply rollers 122 in advance. The stratified film roll 120 from each of the supply rollers,122 is separated, by the film separation member 203, into the light-transmissible resin film 201A as a protective film and the other stratified film 201B consisting of the other light-transmissible resin film and the photosensitive resin layer exposed on its side to be stuck to the panel. The separated light-transmissible resin film.201A is wound on the winding roller 204. A pair of such winding rollers 204 are provided over and under a panel conveyance passage I—I as well as the film supply rollers 122. The leading edge of the separated stratified film 201B is fed to the main vacuum suction plate 206 or 130, which is a film feed member, along a tension roller 205. The main vacuum suction plate 206 has a leading end portion 206D. A static electricity eliminator 218 for the film 201B is provided near the main vacuum suction plate 206.

As shown in FIG. 17, the main vacuum suction plate 206 is provided so as to be vertically moved toward and away from the position of the sticking of the stratified film 201B to the panel 222. The main vacuum suction plate 206 is slidably fitted on a guide rail 207 attached to a support plate 208 for the suction plate. The support plate 208 is coupled by a rack (not shown in the drawings) and a gear 210 to a mounting frame attached to the body of the sticking apparatus, so that the support plate can be vertically moved. The gear 210 is engaged with a rack 209 provided on a support plate coupling rod 232 which is for the upper and the lower main vacuum suction plates 206 and is coupled to a drive motor 211. A film holding member 212 for holding the leading edge portion of the film 201B is slidable fitted on horizontal guide rails attached to the support plate 208, and is provided with coupling notched members in which coupling rods 213 are fitted. The rods 213 are attached to a support member 213 which supports a fixed cutting member 215. A rotary cutting member 217 is rotatably supported by a support plate 216. The cutting edge of the rotary cutting member 217 extends obliquely at a prescribed angle. Air blowoff pipes 219 and 220 for blowing air to the film 201B are provided over and under the support plate 216.

FIG. 17 also shows pressure sticking rollers 221, the panel 222, driving rollers 223A, driven rollers 223B, panel holders 223 each including a panel holding roller and a pneumatic cylinder for vertically moving the holding roller, vacuum suction bars 225, wetting rollers 226, rollers 227 for wiping the pressure sticking rollers, pneumatic cylinders 228 for the wiping rollers, kinematic coupling and support members 229 for the wiping rollers, base pate wiping rollers 230, pneumatic cylinders 231 for the panel wiping rollers, the support plate coupling rod 232 for the upper and the lower main vacuum suction plates, and a coupling rod attaching member 233.

When the stratified films 201B are to be stuck to the panel 222 by the sticking apparatus, each of the films is moved along the direction of the conveyance of the panel so that the panel is conveyed in between the mutually-facing stuck sides of the films and the upper and the lower pressure sticking rollers 221 are then put into pressure contact with the films on the panel being conveyed through between the rollers, thus sticking the films to the panel.

As described above, the roller support members 21A and 21B are supported by the body frames 1A and 1B of the sticking apparatus so that the members can be slid rightward or leftward by a means in order that the continuous stratified film 120, which is fed form the film supply roller 122, and the stratified film 201B, which is stuck to the conveyed panel, are made coincident with each other at the center line of the former film in the direction of the feed thereof and that of the latter film in the direction of the conveyance of the panel. For that reason, it can be efficiently, securely and easily performed that the continuous stratified film 120 is set on the film supply roller 122 and the center of the width of the stratified film 201B is positioned at that of the length of the main vacuum suction plate 130 or 206.

Since the film 201B to be stuck to the panel 222 is set under optimal tension depending on the width and winding diameter of the film, it is less likely that an air bubble is formed between the film and the panel or and the film is wrinkled. This results in enhancing the yield in the sticking of the film to the panel.

Since the initial film width center position setting scales 131 are provided in prescribed positions on the upper and the lower main vacuum suction plates 130 or 206, positioning the center of the width of each of the upper and the lower continuous stratified films 120 at that of the length of the main vacuum suction plate can be precisely and easily performed in a shortened time.

Since the centering mechanism, by which the panel 222 conveyed by the panel conveyor, is trued up into a prescribed position, is provided with the true-up center position setting scale, the continuous stratified film 120, which is fed from the film supply roller 122, and the stratified film 201B, which is stuck to the conveyed panel, can be easily made coincident with each other at the center line of the former film in the direction of the feed thereof and that of the latter film in the direction of the conveyance of the panel.

The present invention is not confined to the embodiment described above, but may be embodied or practiced in other various ways without departing from the spirit or essential character thereof.

According to the present invention, it can be efficiently, securely and easily performed that a continuous stratified film is set on a film supply roller and the center of the width of the film is positioned at that of the length of a film feed member. Since it is made less likely that an air bubble and/or a wrinkle are formed while sticking the film to a panel, thus the yield in the process is enhanced. Each of upper and lower such continuous stratified films can be precisely and easily set in a center position within a shortened time. The portion of the continuous stratified film, which is fed from the film supply roller, and the other portion of the film, which is adhered to the conveyed panel, can be easily made coincident with each other at the center line of the former portion in the direction of the feed thereof and that of the latter portion in the direction of the conveyance of the panel.

We claim:

1. An apparatus for adhering a continuous film to a panel wherein said film is fed from a roll and cut off at predetermined lengths to be bonded to said panel by a pressure roller, said apparatus comprising:
   a frame;
   a conveyor mounted on said frame for conveying said panel in a first direction;
   at least one support member slidably mounted in said frame so as to be movable back and forth with respect to said frame in a second direction transverse to said first direction;
   a film supply roller supported by said support member, said film being disposed on said roller in the form of said roll;
   means for moving said support member in said second direction; and
   a continuous film width center setting scale provided on said apparatus so as to allow the continuous film pulled out from the film supply roller to be set in a prescribed position on a film feed member by said moving means.

2. An apparatus for adhering a continuous film to a panel wherein said film is fed from a roll and cut off at predetermined lengths to be bonded to said panel by a pressure roller, said apparatus comprising:

a frame;

a conveyor mounted on said frame for conveying said panel in a first direction;

at least one support member slidably mounted in said frame so as to be movable back and forth with respect to said frame in a second direction transverse to said first direction;

a film supply roller supported by said support member, said film being disposed on said roller in the form of said roll;

means for moving said support member in said second direction; and means for aligning the panel conveyed by said conveyor in a direction transverse to said direction of conveyance, and a true-up center position setting scale provided in cooperation with said aligning means.

3. An apparatus for adhering a continuous film to a panel wherein said film is fed from a roll and cut off at predetermined lengths to be bonded to said panel by a pressure roller, said apparatus comprising:

a frame;

a conveyor mounted on said frame for conveying said panel in a first direction;

at least one support member slidably mounted in said frame so as to be movable back and forth with respect to said frame in a second direction transverse to said first direction;

a film supply roller supported by said support member, said film being disposed on said roller in the form of said roll;

means for moving said support member in said second direction;

an electromagnetic brake and a powder brake provided on a film supply roller holding shaft; and means for controlling said electromagnetic brake and said powder brake so as to apply a prescribed tensile force to the continuous film depending on the width and winding diameter thereof.

* * * * *